(12) United States Patent
Grant, Jr.

(10) Patent No.: US 11,214,513 B1
(45) Date of Patent: Jan. 4, 2022

(54) GLASS COATING SYSTEM

(71) Applicant: United Ballistic Systems LLC, Stafford, TX (US)

(72) Inventor: Marc Stephen Grant, Jr., Richmond, TX (US)

(73) Assignee: United Ballistic Systems LLC, Stafford, TX (US)

( * ) Notice: Subject to any disclaimer, the term of this patent is extended or adjusted under 35 U.S.C. 154(b) by 694 days.

(21) Appl. No.: 15/960,126

(22) Filed: Apr. 23, 2018

Related U.S. Application Data

(60) Provisional application No. 62/489,225, filed on Apr. 24, 2017.

(51) Int. Cl.
*B29C 65/00* (2006.01)
*C03C 17/00* (2006.01)
(Continued)

(52) U.S. Cl.
CPC ........ *C03C 17/002* (2013.01); *B29C 65/5007* (2013.01); *B29C 65/7802* (2013.01); *B29C 66/41* (2013.01); *B29C 66/45* (2013.01); *B29C 66/472* (2013.01); *B29C 66/81* (2013.01); *B29C 66/8169* (2013.01); *B29C 66/836* (2013.01); *B29C 66/8362* (2013.01); *B29C 66/83413* (2013.01); *B32B 38/10* (2013.01);
(Continued)

(58) Field of Classification Search
CPC ... B32B 43/006; B32B 38/10; B29C 65/5007; B29C 65/7802; B29C 66/41; B29C 66/45; B29C 66/472; B29C 66/81; B29C 66/8169; B29C 66/83413; B29C 66/836; B29C 66/8362
See application file for complete search history.

(56) References Cited

U.S. PATENT DOCUMENTS 3,671,362 A * 6/1972 Pierce ..................... B32B 37/10
156/552
3,971,691 A * 7/1976 Cairns ................... B29C 63/024
156/497
(Continued)

FOREIGN PATENT DOCUMENTS

JP 2011187464 A * 9/2011

OTHER PUBLICATIONS

Translation of specification of JP 2011-187464A (Year: 2011).*
ROLLSROLLER® Platform Applicator, rollsroller.se, 5 pages.

*Primary Examiner* — Mark A Osele
*Assistant Examiner* — Nickolas R Harm
(74) *Attorney, Agent, or Firm* — Patterson + Shendan, LLP

(57) ABSTRACT

An apparatus for applying the film to the substrate includes a bed having a substrate placement surface and a selectively positionable tack bar, a roller support moveable over the span of the bed, and including the location of the positioning bar, and a roller rotatably supported to the positioning bar and moveable over the bed in response to movement of the roller support with respect to the bed. In another aspect, the tack bar is of the same thickness, or slightly less thick, as the substrate onto which the film is to be applied, such that a portion of the film to be applied can be secured thereto and not on the substrate before the backing is removed from additional portions of the film, such that the tack bar supports an end of the film in substantially the plane of, or slightly below the plane of, the substrate.

12 Claims, 10 Drawing Sheets

(51) Int. Cl.
  *C03C 17/32* (2006.01)
  *B32B 43/00* (2006.01)
  *B32B 38/10* (2006.01)
  *B29C 65/78* (2006.01)
  *B29C 65/50* (2006.01)

(52) U.S. Cl.
  CPC .......... *B32B 43/006* (2013.01); *C03C 17/324* (2013.01); *C03C 17/328* (2013.01); *C03C 2217/70* (2013.01); *C03C 2218/118* (2013.01); *C03C 2218/31* (2013.01)

(56) References Cited

U.S. PATENT DOCUMENTS

| | | | | |
|---|---|---|---|---|
| 5,230,765 | A * | 7/1993 | Weiselfish | B65C 1/02 156/350 |
| 5,246,331 | A * | 9/1993 | Hallahan | E06B 3/6733 269/305 |
| 5,433,818 | A * | 7/1995 | Lee | B65G 49/065 156/576 |
| 5,637,177 | A * | 6/1997 | Os | B29C 66/342 100/156 |
| 5,679,203 | A * | 10/1997 | Sakai | B29C 63/0013 156/750 |
| 5,795,435 | A * | 8/1998 | Waters, Jr. | B32B 38/10 156/540 |
| 5,810,965 | A | 9/1998 | Fwu | |
| 6,102,096 | A | 8/2000 | Johansson et al. | |
| 6,571,849 | B2 * | 6/2003 | Erickson | B65H 35/0013 156/267 |
| 6,868,884 | B2 * | 3/2005 | Briese | B65H 35/0013 156/358 |
| 7,014,728 | B2 * | 3/2006 | Kuhn | B65H 35/0013 156/248 |
| 8,936,690 | B2 * | 1/2015 | Balaschak | H01L 31/048 156/163 |
| 9,089,085 | B2 * | 7/2015 | Patel | B29C 63/0004 |
| 2002/0092608 | A1 * | 7/2002 | Erickson | B44C 1/1725 156/247 |
| 2007/0074803 | A1 * | 4/2007 | Spotts | E06B 3/67339 156/64 |
| 2014/0041583 | A1 * | 2/2014 | Donohue | B32B 37/0046 118/696 |
| 2014/0090784 | A1 * | 4/2014 | Hansen | B29C 63/024 156/378 |

* cited by examiner

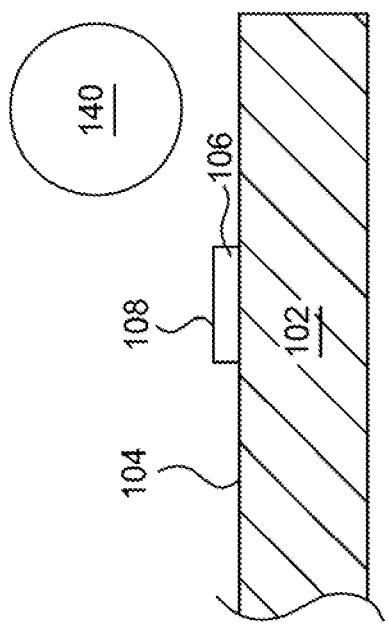
FIG. 8
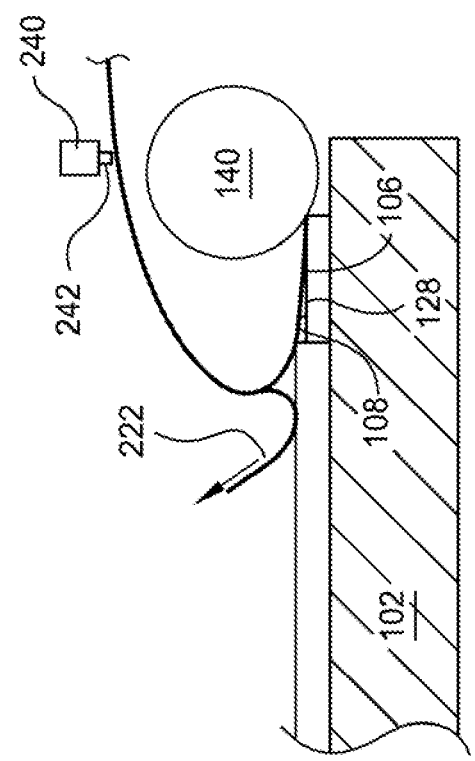
FIG. 9
FIG. 11
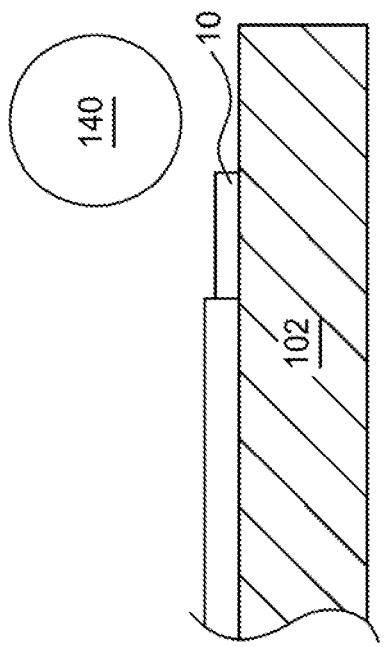
FIG. 10

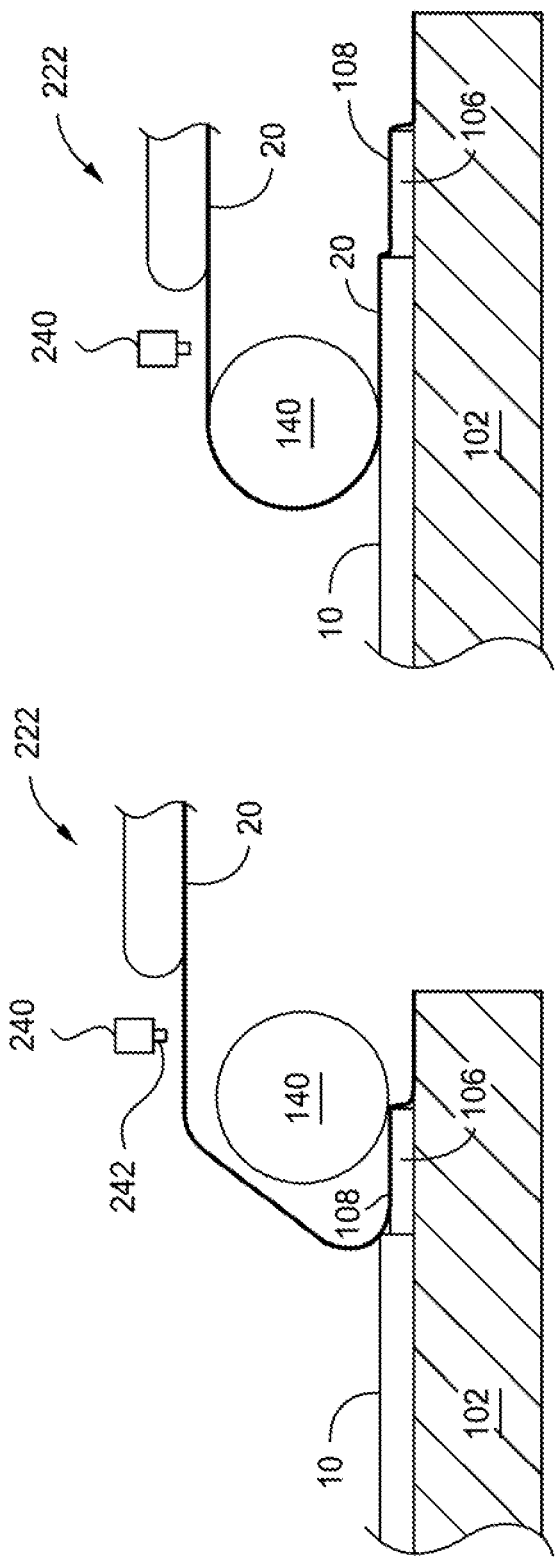

GLASS COATING SYSTEM

CROSS-REFERENCE TO RELATED APPLICATIONS

This application claims benefit of U.S. Provisional Patent Application Ser. No. 62/489,225, filed Apr. 24, 2017, which is herein incorporated by reference.

BACKGROUND

Security concerns over home or business break-ins, wherein window glass is broken to obtain access to the interior of a structure, is an increasing concern. Additionally, in public facilities, in particular schools, concern over a ballistic projectile penetrating a window and injuring individuals within the building has resulted in local regulations requiring window glass having a greater resistance to blast and projectile impacts, as well as against tools used to break glass to gain entry into the building, than the original fenestration covering. These regulations apply to new school and other local government buildings, as well as existing ones. As a result, there is a need to retrofit windows in these buildings with glass meeting these regulations. However, in many cases, particularly where the windows for which the glass must be installed are old, retrofit glass capable of meeting the requirements of the regulations is not readily available to fit the installed window, or is prohibitively expensive or prohibitively heavy and cannot be located in the existing frame or sash. Alternatively, the building owner can consider ordering new windows, including the frame or sash, to meet the safety regulations. However, this is likewise prohibitively expensive in most cases.

One known approach to provide greater protection against impact, without providing security glass such as glass having embedded wires, etc., is to apply a security film over the glass. These security films, such as 3M™ S600 Safety and Security Film, and similar films available from Madico and Lumar, are advertised to meet defined safety and security standards for impact and blast resistance once installed on the interior side of a pane of glass, i.e., even if a ballistic projectile impact of a projectile rated to be stopped, or other impact, occurs and the glass breaks, the film will prevent the glass from being easily separated from the underlying film and will likewise prevent the projectile from passing completely through the glass and film coating layers, thereby in the case of a single impact, protecting the building occupants from flying glass because the glass does not penetrate the film, preventing the projectile from entering the facility, or frustrating those attempting to break into the building by shattering the glass of the window.

Installation of the film on the glass, following the manufacturer's instructions, includes applying a slip solution consisting of one cup-full of baby shampoo or household detergent to one gallon of water, and first applying that to the glass. The security film includes an adhesive backing, covered by a protective sheet, and at installation the protective sheet is peeled away, and the adhesive side of the security film is placed against the glass, over the slip solution, and aligned to the glass. Thereafter, the slip solution is applied to the exposed side of the security film, and a squeegee is drawn across the security film to push the film, and adhesive coating thereon, against the glass. The slip coating provides two functions: It allows the user to move the coating film having the adhesive exposed thereon with respect to the glass to align the coating film to the glass, and also allows the squeegee to glide across the exposed surface of the coating film as it is pressed thereby against the glass.

The above referenced methodology allows the coating film to be applied to the glass, i.e., adhered thereto, but, the slip solution remains behind in small quantities, and as a result, over time, particularly where the glass is exposed to strong sunlight, portions of the slip solution trapped between the glass and the security film vaporize, resulting in visual clouding or haze at the location where the slip solution has vaporized. If sufficient slip solution is present and vaporizes in a location between the glass and the security film, the security film can begin peeling away from the glass, defeating its protective purpose, and the vapor also causes blisters or bubbles to form between the glass and film coating. For sometimes esthetic reasons, as well as security concerns, if pealing, bubbling or blistering occur, the window glass and coating film must be replaced.

As a result of these issues, when the expected warranty costs to remove the glass having haze, blisters or bubbles between the glass and film coating from the frame, return the glass to the film coating facility, and remove and reapply the coating film to the glass is considered, the cost to apply the coating film is prohibitive to the building owner if it is included in the cost of the film coating application, and this renders the cost of using a post-glass manufacturer film coating to protect against blast and impact prohibitive. If the warranty cost is included in the cost of applying the coating film, that renders the applying of the film unprofitable, or money losing, to the manufacturer, when it must be periodically replaced at no cost to the customer. Additionally, applying the slip coating and the coating film, where the process has previously resulted in clouding, haze and separation, is likely to again result in the same clouding, haze or separation in the refurbished product. As a result, the use of these safety coating films has not reached its full potential.

If the coating film is applied without the use of the slip solution, applying the film with the adhesive exposed to the glass, and manually pressing the film against the glass to adhere it thereto, results in bubbles occurring where the film is not adhered to the glass. Applicant has found that the manual application of the film without the slip coating is extremely time consuming, and as a result, the manufacturing cost to apply the film manually to avoid the moisture issues encountered following the manufacturers' instructions results in a product where the resulting cost is prohibitive.

SUMMARY

Provided herein are apparatus and methods for applying a film to a sheet product, such as glass used in windows, doors, skylights and the like. In one aspect, an apparatus for applying the film to the substrate includes a bed having a substrate placement surface and a selectively positionable tack bar, a roller support moveable over the span of the bed, and including the location of the tack bar, and a roller rotatably supported by the roller support and moveable over the bed in response to movement of the roller support with respect to the bed. In another aspect, the tack bar is of the same thickness, or slightly less thick, than the substrate onto which the film is to be applied, such that a portion of the film to be applied can be secured thereto and not on the substrate before the backing is removed from additional portions of the film, such that the tack bar supports an end of the film in substantially the plane of, or slightly below the plane of, the planar surface of the substrate. In another aspect, the substrate can be located abutting the tack bar, such that no, or a small, gap exists between the edge of the surface of the substrate and the upper surface of the tack bar. In a further aspect, the tack bar is moveable with respect to, i.e., moveable substantially perpendicular to the substrate placement surface of the bed, such that the upper surface thereof can be closely aligned co-planar, or nearly co-planar, with the surface of a substrate to which the film is to be applied. In a yet further aspect, the placement surface of the bed may include a plurality of holes extending thereinto from which a gas, supplied above local environmental pressure, is applied during loading of the substrate onto the placement surface to allow relatively easy maneuvering of the substrate into a desired position, such as a side surface of the tack bar, and, after coating the substrate with the coating film(s), to un-stick the substrate from the placement surface. In a further aspect, the apparatus includes an ionizer, configured and arranged to direct an ionized gas, such as clean air, over the surface of the adhesive on the film before the film reaches the substrate surface to which it is to be supplied. In a further aspect, the film is maintained in a rolled up state, and unrolled therefrom to the substrate surface.

A method of applying an adhesive coated sheet to a substrate includes providing a bed comprising an substrate placement surface and a tack bar, providing a roller support moveable over the span of the bed and including a positioning bar, providing a roller rotatably supported by the roller support and moveable over the bed in response to movement of the roller support with respect to the bed, providing a substrate having a thickness, wherein the thickness is equal to, or greater than, the distance of the distal surface of the tack bar from the bed, positioning the substrate on the substrate placement surface in a position whereby a portion thereof is immediately adjacent to the tack bar; cleaning an exposed surface of the substrate; removing a portion of the protective sheet to expose a first portion of the film; adhering the first portion of the film to the tack bar; positioning the portion of the protective sheet removed from the film on the surface of the tack bar distal from the bed; pressing the roller against the portion of the film on the tack bar; and moving the roller support, with the roller pressing against the sheet on the tack bar, and cause the roller to roll over the portion of the film overlying the substrate while securing the portion of the protective sheet removed from the film, thereby causing the protective sheet to pull away from a second portion of the film and adhere the film to the substrate.

BRIEF DESCRIPTION OF THE DRAWINGS

FIG. 8 is a schematic side view of the bed of the coating apparatus with the tack bar missing or withdrawn;

FIG. 9 is a schematic side view of the bed of the coating system showing the tack bar extending above the substrate receiving surface of the bed of the coating apparatus;

FIG. 10 is a schematic side view of the bed of the coating apparatus with a glass substrate positioned against the tack bar;

FIG. 11 is a schematic side view of the bed of the coating system showing a first coating film having the adhesive thereof contacting the tack bar, and the protective sheet covering the adhesive surface partially peeled away, and the remainder of the coating film extending between a press roller and an ionizer bar;

FIG. 12 is a schematic side view of the bed showing the protective film peeled from the adhesive such that the adhesive coated surface of the coating film is exposed to the ionizer bad;

FIG. 13 is a schematic side view of the bed showing the roller rolled across a portion of the glass substrate to adhere the coating film thereto.

DETAILED DESCRIPTION

Figure 1:
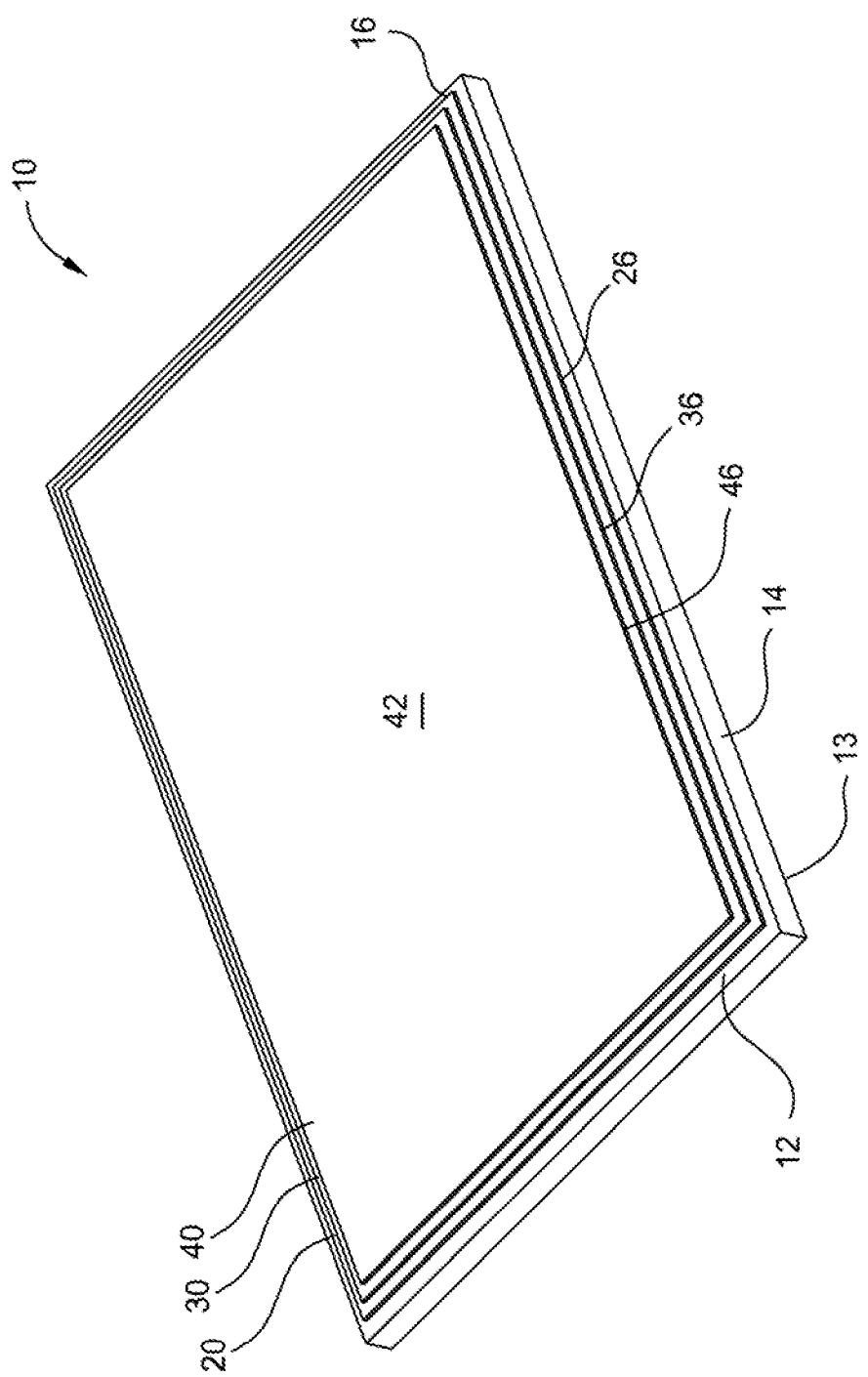
FIG. 1 is an isometric view of a glass substrate, coated with three layers of coating film applied using the methods and apparatus hereof.
Figure 1A:
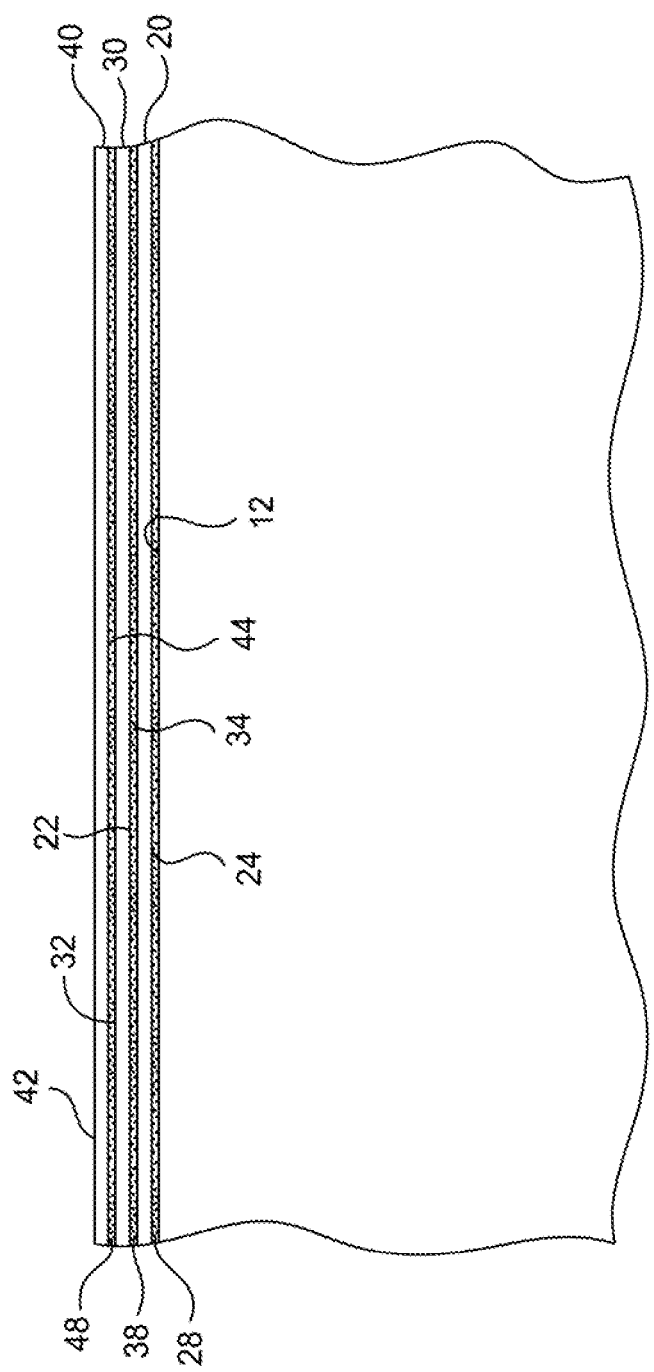
FIG. 1A is an enlarged partial view of the glass substrate of FIG. 1.

Referring initially to FIGS. 1 and 1A, a substrate such as a glass substrate 10 includes a generally flat upper surface 12, a back surface 13 and an edge 14. The edge 14 is circumferential, and where the glass substrate is circular, or ovoid, in circumference, extends continuously around the circumference of the glass substrate. Where not circular or ovoid, the edge will comprise at least two surfaces, such as where a half-moon shaped glass substrate is to be film coated, three sides, such as triangular, four sided such as rectangular, five sided as in having a pentagonal perimeter, etc. In the figures, the glass substrate is shown as a rectangular circumferential shape in plan view and having a beveled surface 16 extending downwardly from the generally flat upper surface 12 thereof and outwardly to the edge 14 of the substrate, which bevel extends around the circumference of the generally flat upper surface 12 which forms the film receiving surface of the substrate. The bevel may also extend between the back surface of the glass substrate and the edge 14. The beveled surface 16 along the edge 14 helps reduce cracking of a glass substrate which can occur where the edge 14 is a sharp corner, and also assists the installer of the film coated glass to insert the film coated glass substrate into an existing window frame opening during retrofitting of coated glass into a structure.

Covering the film receiving surface 12 of the glass substrate 12 are a plurality of film layers, herein three film layers 20, 30 and 40. Each film layer 20, 30 and 40 is a generally solid sheet, that may include embedded fibers, of a polyethylene, polycarbonate, or other significantly transparent material, which sheet includes a front surface 22, 32, 42 respectively, a back surface 24, 34 and 44 respectively, an edge 26, 36, 46 respectively, generally in the same shape as the circumferential shape of the glass substrate 10, and an adhesive layer 28, 38 and 48 respectively on the back surface 24, 34 and 44 sides thereof. Film layer 20 is adhered, by the adhesive film 28, to the front surface 12 of the glass. Film layer 30 is adhered, by the adhesive layer 38, to the front surface 22 of the film layer 20, and film layer 40 is adhered, by adhesive layer 48, to the front surface 32 of the second film layer 30. Additionally, the film layers 20, 30 and 40 are not located over the beveled surface 16, and are chamfered or beveled in the direction of over the front surface of the glass 12 as shown in FIG. 1 such that the edges thereof are generally co-planar to the surface of the bevel 14. A greater of lesser number of individual film layers may be applied to the glass, based upon the desired performance of the resulting film coated glass product.

Figure 2:
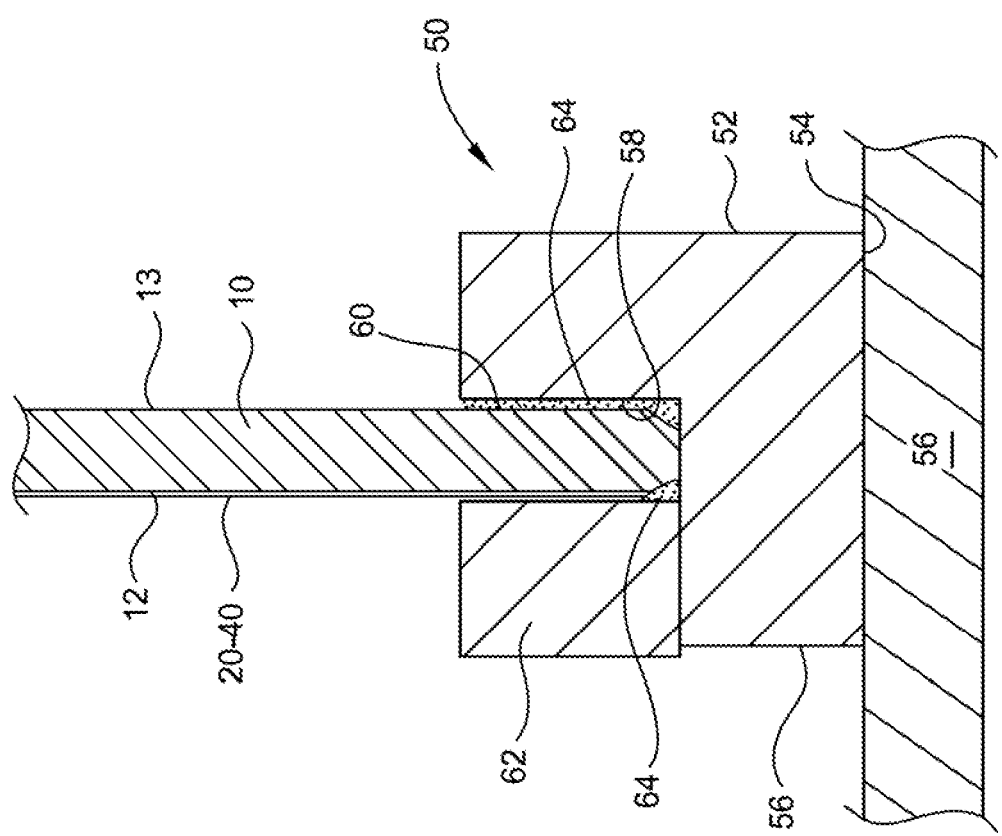
FIG. 2 is a partial sectional view of the glass substrate of FIG. 1 installed in a frame.

FIG. 2 shows the glass substrate located in a window frame or casing 50. Frame 50 includes a first direction facing surface 52, a side facing surface 54 facing the adjacent building structure 56, and a second direction facing surface 58 forming a ledge against which a first side 60 of the glass substrate 10 rests with a sealant/adhesive therebetween, and is secured. A backing bar 62 may extend over the coating film 20-40 covered side of the glass 10 adjacent to the ledge and the backing bar 62, to prevent the glass substrate 10 from pulling away from the second facing direction surface 58, or a large mass of sealant may be provided in its' stead. The front surface 12 of the glass substrate 10, on which the film layers 20, 30 and 40 are located, faces the interior of the building in which frame 50 is secured. If a projectile, such as windblown debris, low energy projectiles, a tool such as a hammer used by a potential intruder, and the like, or blast energy fractures the window from the exterior (glass substrate second side 13), the film layers 20, 30 and 40 maintain the integrity of the window glass, at least for a period of time to prevent injury to individuals therein, and preferably to prevent the forming of an opening through the frame (or the glass in the frame).

Figure 3:
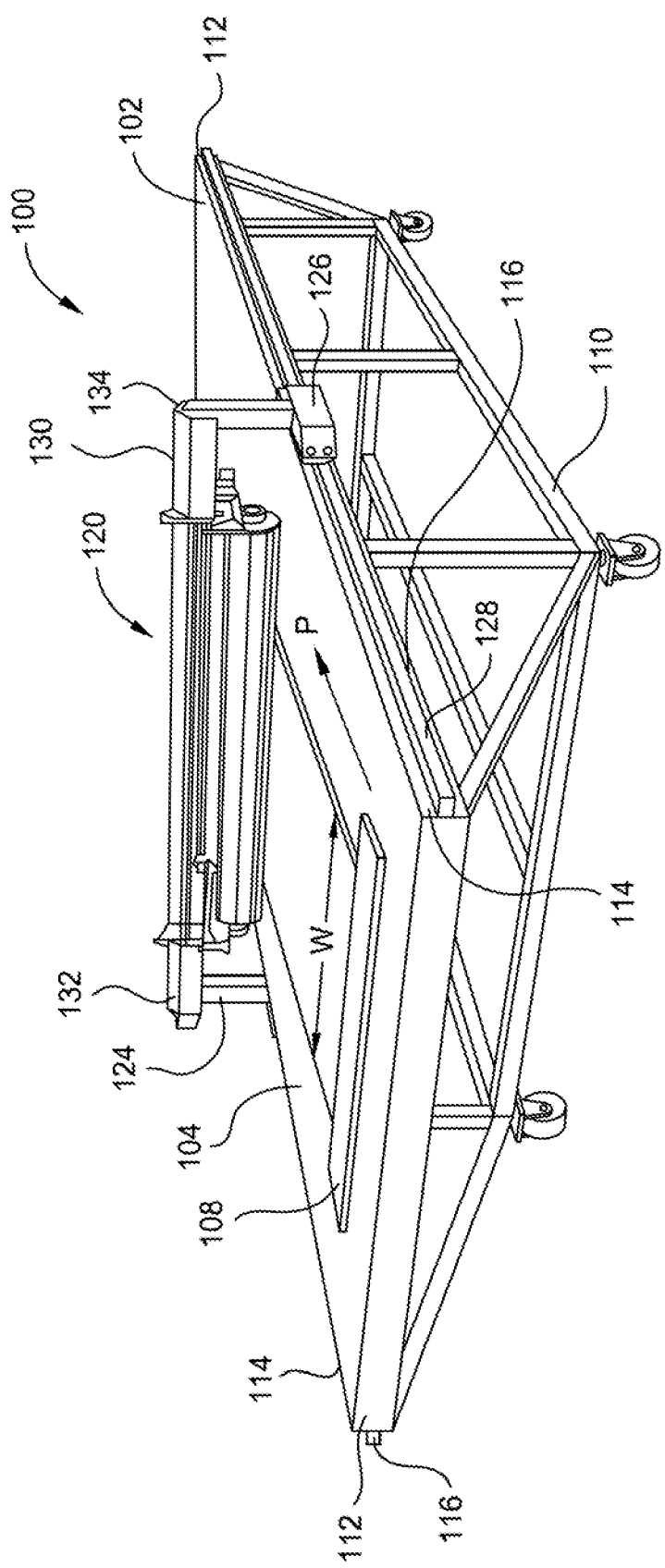
FIG. 3 is a perspective view of a coating apparatus useful to adhere the coating film to the glass substrate.

Referring to FIG. 3 there is shown a coating apparatus 100, including a bed 102, having a substrate receiving surface 104. In the embodiment, the bed 102 is secured over a ground surface such as the floor of a film layer installation facility, by an underlying frame 110. Bed 102 is generally rectangular in profile, and its dimensions of length "L" and width "W" limit the largest size of a substrate which can be film coated thereon.

The substrate receiving surface 104 is generally rectangular in plan view, having opposed short side walls 112 intersected at the opposed ends thereof by opposed long side walls 114. The substrate receiving surface is generally flat, i.e., lies in a plane, and is configured to support one side of a glass substrate 10 thereon. Coating apparatus also includes moving bridge assembly 120, which spans across the bed 102 generally parallel to the short side walls 112. The bridge assembly 120 includes a pair of support guides 124 secured to tracks 126 (only one shown) on the long side walls 114 on opposed sides of the bed 102. The tracks hereof are configured as C shaped, in section, channels 128, wherein the outline of each channel 128 substantially encloses an interior guide volume which wheel shaped rollers of the support guides 124 are secured, but can roll in the direction between the opposed short side walls 112, herein after process direction P, and thereby each of the support guides 124 is linearly moveable along the guides in the direction between the opposed side walls, and the travel span ends inwardly of each short side wall 112 The channels 128 may optionally be secured to the opposed short side walls 112 of the bed 102 or therebelow on opposed sides of the frame 110.

The upper ends of the support guides 124, distal to the tracks, extend to a height above the bed 102, to either side thereof. A cross bar 130 extends over the bed 102, and is connected at the opposed ends thereof to the upper ends 134 of the support guides 124. The cross bar 130 and guides 124 are connected with sufficient rigidity such that the cross bar can be scanned across the bed 102 by a user pulling or pushing one of the support guides 124 in the process direction P and the angular orientation of the cross bar 130 with respect to the short side walls 112 (generally parallel thereto) and the long side walls 114 (generally perpendicular therewith) is maintained.

Figure 4:
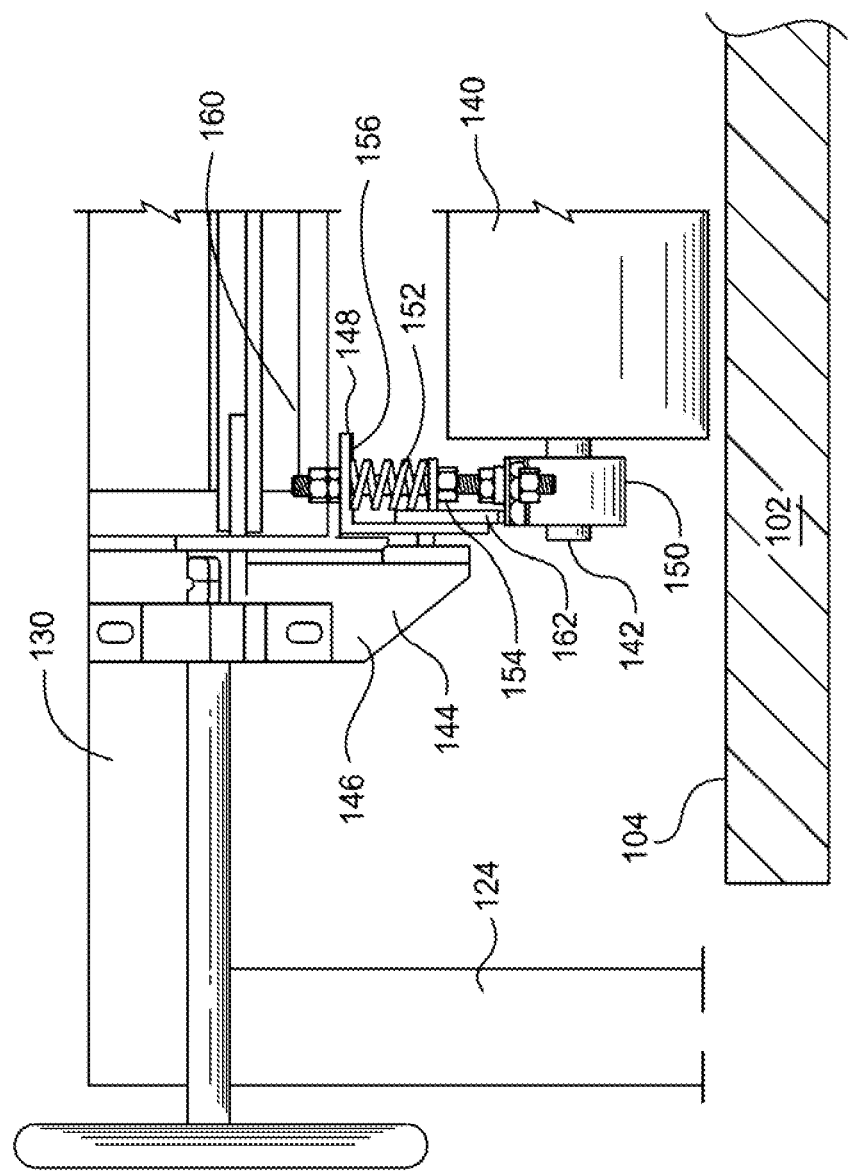
FIG. 4 is a partial end view of the coating apparatus of FIG. 4, showing one paradigm for loading the roller thereof against a coating film on a glass substrate.

FIG. 4 shows a partial side or end view of the cross bar 130, showing the connection and support of a process roller 140 thereby. Roller 140 is configured having a solid core and a polymer or rubber outer sleeve thereover, the sleeve material having sufficient rigidity to push the film layers against the substrate, but sufficient flexibility to conform to any small contour on the underlying substrate. Cross bar 130 is shown connected to the upper end 134 of support guide 124, and to the side of support guide 124, supports the side of the process roller 132. It will be appreciated that a similar structure is attached to, and located inwardly of, the upper end 134 of the other support guide 124, such that the process roller is supported at its opposed ends by shafts 142 extending therefrom into piloted bores of a bias assembly 144 supported at the upper end thereof on cross bar 130. A bias assembly 160, as shown in FIG. 4, is provided at the opposed ends of the roller 140 and cross bar 130, and includes a suspension plate rigidly attached to cross bar 130, from which it extends downwardly and supports L-bracket 148 thereon. A slider 162 comprising a plate like member terminating at its lower end with a bearing plate 150 includes a boss, or other projection, extending inwardly of a recess or opening through a portion of the L-shaped bracket 148, to maintain directional alignment of the movement of the slider 162 relative to the L-shaped bracket 148, and generally perpendicular to the substrate receiving surface 104 of the bed 102. The shaft 142 of the process roller 140 is received and supported within a bore (not shown) in the bearing plate 150 and the roller 140 is free to rotate about the bearing plate 150. A threaded rod 154 is secured to the bearing plate 150 and extends therefrom, and is secured to, a spring ledge 156 of the L-shaped bracket 148. A coil spring 152 surrounds the threaded rod 154 and is supported at the opposed ends thereof at the spring ledges 156 and the surface of the bearing plate 150. The coil springs 152 at the opposed ends of the roller 140 bias the roller 140 in the direction of the substrate receiving surface 104 of the bed 102.

Figure 6:
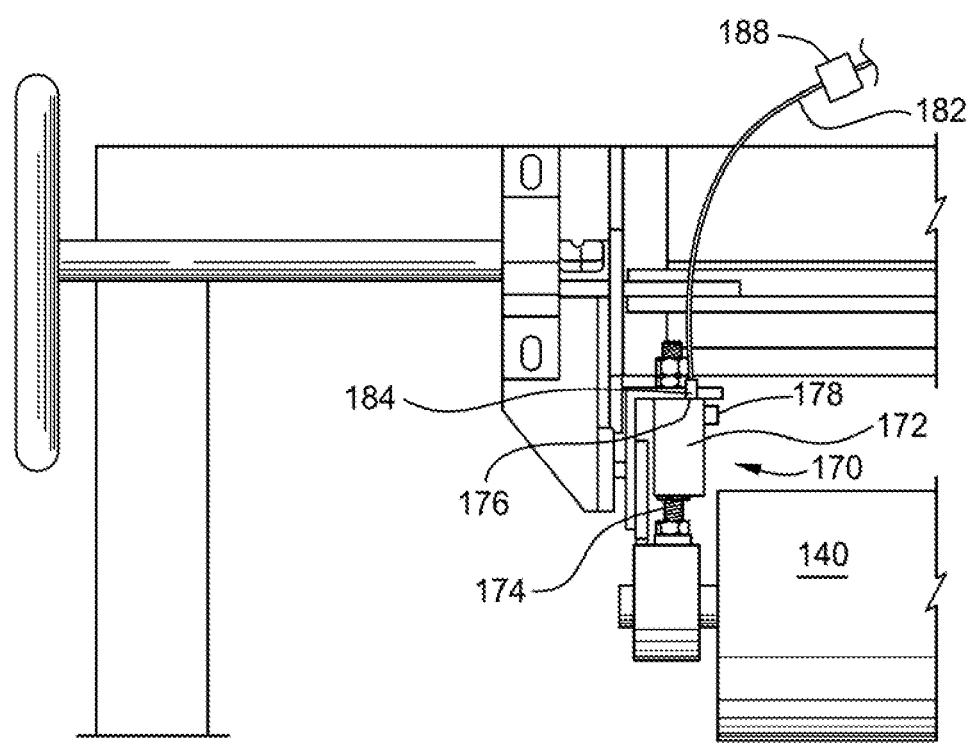
FIG. 6 is a partial end view of the coating apparatus of FIG. 4, showing another paradigm for loading the roller thereof against a coating film on a glass substrate.

In the configuration shown in FIG. 4, the roller 140 is disposed immediately above the substrate receiving surface 104 of the bed 102, and to initiate processing, the actuators move the roller downwardly to engage the upper side of a film to be pressed onto a substrate. As the roller is scanned across the substrate by a user, the bias pressing the film against the substrate surface is created solely by compression or the process roller material and/or the actuator 170 force. As shown in FIG. 6, in an alternate construct, the spring 152 is eliminated and is replaced with a pneumatic actuator 170. The pneumatic actuator includes a pressure housing 172, a drive rod 174 extending from the pressure housing, a fluid inlet port 176, and a relief valve 178. The actuator 170 is spring biased to retract the drive rod 174 inwardly thereof, and thus lift the roller 140 above the substrate receiving surface 104 of the bed 102. The inlet 176 is supplied with a gas, such as clean shop air, from a supply such as a compressor or other source of pressurized air with a pneumatic hose 182 rated for the pressures to be applied to the actuator 170. A pressure sensor 184 is coupled between the hose and the actuator 170, to monitor the gas pressure applied to the actuator inlet port 176. A controller 186, such as a PID controller (FIG. 7), monitors the gas pressure and controls a throttle valve 188 adjacent the pressure sensor to control the gas pressure applied to the actuator 170, and if an overpressure condition exists, open the actuator relief valve 178. The controller is coupled to a control actuator, which may comprised a dial configured to set the bias pressure of the actuator drive rod against the shaft 142 of the roller, to control the force applied by the roller 140 as it rolls across a film being applied to a substrate. The controller 186 reads the dial setting and uses it to maintain a desired pressure in the pneumatic actuator 170. The above described coating apparatus 100 is available from Rolls roller Holding AG, Frigate 3, 653 43 Karlstad, Sweden.

Figure 7:
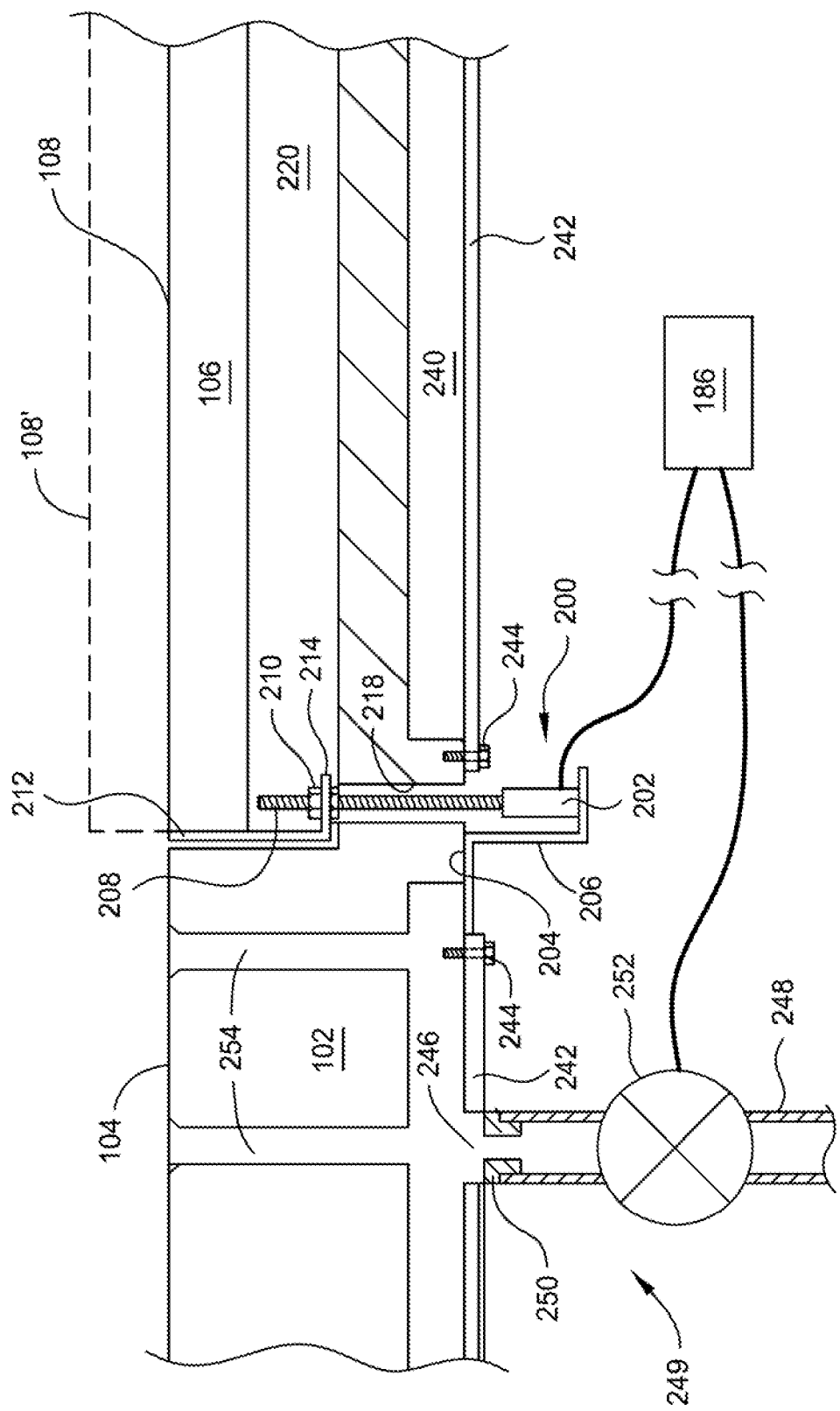
FIG. 7 is a partial sectional view of the bed of a coating apparatus, showing details of an adjustable tack bar and air cushioning apparatus.
Figure 14:
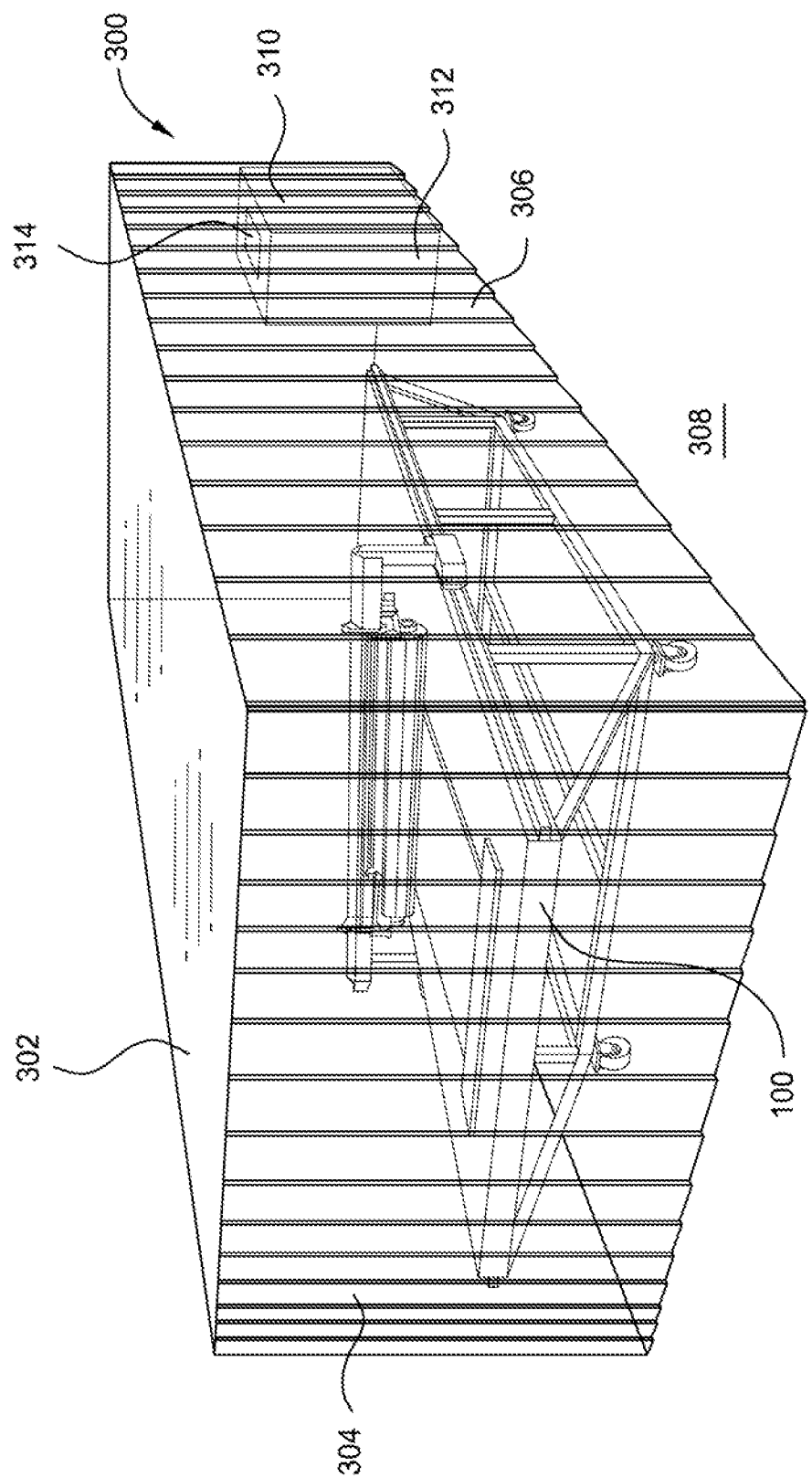
FIG. 14 is a schematic view of a mini environment surrounding a coater.

The coating apparatus 100 of FIGS. 3-6 includes modifications to the manufacturer device, in particular, a tack bar 106 (FIG. 3), an ionizer bar 240 (FIG. 5) and an air suspension system (FIG. 7). Tack bar 106 has an upper surface 108 located above the substrate receiving surface of, and in the embodiment, generally parallel to the substrate receiving surface 104. An ionizer bar 240 is positioned across the bed 102 across the feed path of the coating film. The bed itself includes an air suspension system to enable easy handling of heavy, thick, glass substrates.

Referring again to FIG. 3, the tack bar 106, in one aspect, is a replaceable bar of material, for example plastic, which is placed by the coating film installer on the substrate receiving surface 104 of the bed 102, such that an edge thereof generally conforming to the edge of the substrate to be coated faces the location where a substrate will be positioned on the substrate receiving surface 104. Where, for example, the substrate 10 is a glass substrate having a nominal thickness of one-half inch, the tack bar 106 has a thickness equal to, or less than, one-half inch. The tack bar 106 functions to allow the coating film 20, 30 and 40 to be adhered thereto before the backing is removed from the entire sheet of the coating film 20, 30, 40, and reduces stress on the glass edge as the roller engages the edge of the glass. For different thickness glass substrates 10, a different thickness tack bar 106 is easily deployed.

Referring now to FIG. 7, an alternate tack bar 106 construct is shown. Here a portion of the coating apparatus 100, adjacent to one end of the bed 106 thereof, is shown in section, wherein the tack bar 106 is shown retracted into the bed 102 thereof such that the upper surface 108 thereof is coplanar, or below, the substrate receiving surface 104 of bed 102. The tack bar 106 is moveable between the retracted position shown to a fully extended position shown in phantom, wherein the upper surface, designated 108' thereof, is fully extended from the substrate receiving surface 104, and the upper surface 108 is positionable between the position of upper surface 108' and a position parallel to, or retracted below, substrate receiving surface 104. The bed 102 is provided with a recess 220 extending into the substrate receiving surface 104 thereof, into which the tack bar 106 is selectively retracted.

To move the location of upper surface 108 of tack bar 106 relative to the substrate receiving surface 104, a height adjustment mechanism 200 is provided. In this embodiment, height adjustment mechanism 200 comprises a stepper motor 202 supported from the underside 204 of bed 102 by a bracket 206 attached to the underside 204 by bolts extending into tapped holes in the underside 204, or other mechanisms. Stepper motor 202 is connected to a threaded shaft 208 extending therefrom through a bore 218 connecting the recess 220 and the underside 204 of the bed 102, and the distal end of the threaded shaft 208 extends into the recess 220. This same height adjustment mechanism 200 is connected to the opposite ends of the tack bar 106.

In the embodiment herein, the tack bar 106 extends generally parallel to short side walls 112, and terminates in opposed ends thereof spaced from long side walls 114. At either end thereof, a mounting bracket 212, generally L shaped, includes a generally flat portion attached to the side of the tack bar and a second portion 214 located in the recess and extending generally perpendicular to the first part. A nut 210 is connected to the second portion 214, and the threaded shaft 208 is received in the nut 210. A bracket 210, and stepper motor 202 and bracket 206, are provided at both ends of the tack bar.

To lift or retract the tack bar, the shaft 208 is rotated in one of a clockwise direction (lifting the tack bar) and a counterclockwise direction (retracting the tack bar inwardly of the recess 220). Dictated by the pitch of the thread of the threaded shaft 208, a full or partial rotation of the shaft results in a known motion of the tack bar inwardly or outwardly of the recess. The stepper motor can turn by less than a single turn, resulting in finer height adjustment than a single turn. The stepper motor 202 is electrically connected to the controller 186, and the installer of the coating film selects the height of the tack bar 106 upper surface 108 above the substrate receiving surface 104 by inputting the desired height into the controller, and the controller signals the stepper motor to rotate the shaft the number of full and partial rotations required to move the upper surface to the desired position. To calibrate the tack bar 106 position relative to the substrate receiving surface 104, the upper surface of the tack bar 106 is located parallel and co-linear with the substrate receiving surface 104, and this position is set as level "0" in the controller 186. Thus, based on the thickness of the substrate to be film coated, the height of the tack bar 104 can be set.

To ease the placement of, and removal of, the substrate from the substrate placement surface 104, an air floating system 249 is provided. Here, the air floating system includes a manifold 240 formed by recessing the bed 102 inwardly of the lower surface 204, and covering the recess with a cover plate 242 affixed to the underside of the bed with fasteners such as bolts 244. Alternatively, the cover plate(s) may include a recess therein to form the air/gas manifold. An air supply, such as pneumatic hose 248, is connected to the manifold by a fitting 250 or other connection. The other end is connected to a supply of clean dry gas, such as shop air, with an electrically operable (between open and close states) valve 252 connected to the controller 186. A plurality of air pores or bores 254 extend from the manifold 240 to open at the substrate receiving surface 104 of the bed 102.

When a substrate is being positioned relative to the tack bar 106, or is being removed from the substrate receiving surface 104, the installer actuates the controller to cause compressed air to flow through the valve 252 and thence into manifold 240 and through the bores 254 to form a thin layer of air between the substrate receiving surface 104 and the underside of the substrate. When loading the glass substrate 10, this allows the installer to manipulate the glass substrate 10 such that a side thereof abuts the tack bar 106. When the glass substrate 10 is to be removed from the substrate receiving surface 104, the air lifts the glass substrate 10 slightly to break electrostatic bonds tending to hold the substrate against the substrate receiving surface 104, and thereby allow the glass substrate 10 to be removed therefrom. When the glass substrate 10 needs to remain stationary, such as during application of the coating film layers, the controller 186 actuates the valve 252 to the closed position, and air does not flow therethrough to the manifold 240, and the mass of the substrate and friction between the substrate and bed 102 prevents substrate movement.

Figure 5:
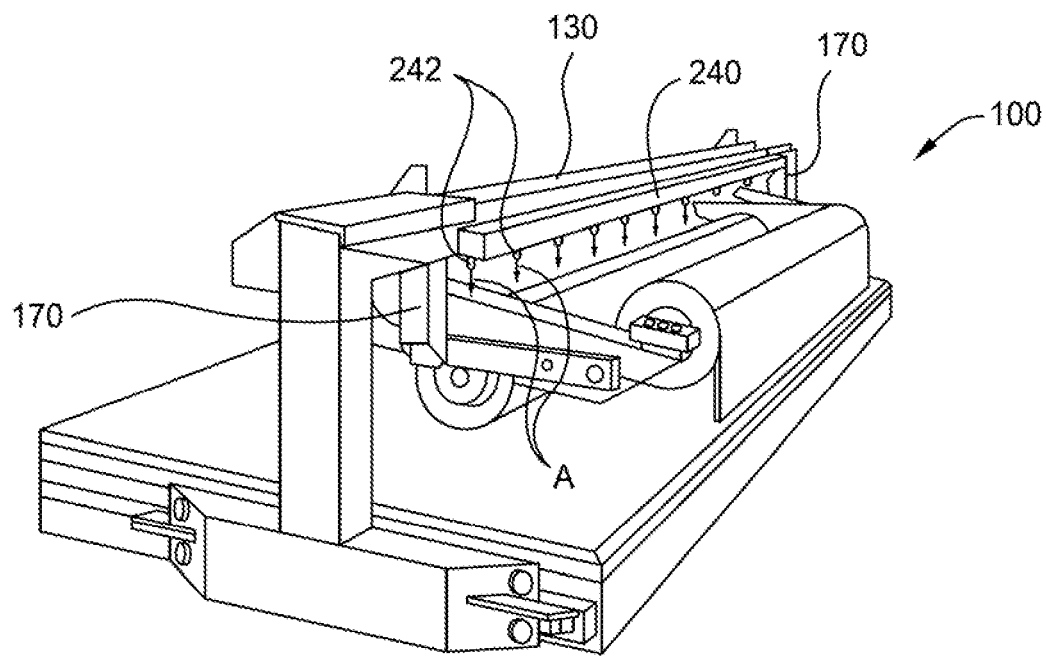
FIG. 5 is a partial perspective view of a coating apparatus including an ionizing bar.

Referring to FIG. 5, an ionizer bar 240 is shown connected to the cross bar 130 and thus extends across a coating film feed path of the apparatus 100. A plurality of nozzles 242 extend from the lower surface thereof, to release ionized ambient air therefrom in the direction of the coating film feed path to ionize the surface thereof, or the surface of the adhesive where the protective film has been removed to expose the adhesive, so as to repel dust and other particulates from the coating film during the application thereof to the glass substrate 10 or a coating film layer (20, 30) already thereon.

Referring now to FIGS. 8 to 13, the application of a layer of film, using the film coating apparatus 100 hereof, is shown. For clarity reasons, in these figures the support structure for supporting the roller 140 is not shown. Referring initially to FIG. 8, an end portion of the bed 102 is shown before the placement of the glass substrate to be coated onto the substrate receiving surface 104. The roller 140 is supported above the substrate receiving surface 104 by first distance 220, for clarity. In this configuration the film installer may, where needed, clean the substrate receiving surface 104 with isopropyl alcohol, followed by wiping with a tack cloth, and then spray the substrate surface with a stream of clean shop air.

In FIG. 9, the tack bar 106 is provided to provide a film starting surface (upper surface 118) above the underlying substrate receiving surface 104 of the bed 102. The height of the upper surface 118 above the substrate receiving surface 104 is intended to be parallel to, or slightly below, the plane of the to be coated surface of the glass. This is provided by either selecting a tack bar 106 having the proper thickness, and providing it on the substrate receiving surface 104 of the bed generally parallel to the rotation axis of the roller, or, by moving an integral tack bar upwardly above the substrate receiving surface 104 such that the upper surface 108 thereof is at the desired height above the substrate receiving surface 104.

In FIG. 10, the glass substrate 10 is positioned on the substrate receiving surface 104, and a side surface thereof is abutted against the side of the tack bar distal from the adjacent side wall 112 of the bed 102.

In FIG. 11, the first coating film 20 is located over the tack bar, and the glass 10, and the backing 222 covering the adhesive layer 128 is peeled off of the coating film to expose the adhesive layer 128, and the coating film is pressed against the tack bar to tack that portion of the coating film to the upper surface 108 of the tack bar 106 or over the portion of the coating film 20 thereof overlying the tack bar 106. Once the coating film is tacked to the tack bar 106, the roller 140 is positioned at the end or side of the tack bar distal from the glass, and an actuator pressure is selected for the bias pressure of the roller against the coating film/glass sandwich. For example, a pressure of greater than 0 and up to 1 MPa is employed. The portion of the coating film extending from the tack bar 106 bends away from the surface of the glass, and back between the roller 140 and the nozzles 242 of the ionizer bar.

The coating film may, at this point, extend from a roll of coating film on the feed roller, or alternatively, no feed roller is used, and the coating film 20 is cut into a sheet slightly larger than the surface of the glass being coated.

Referring to FIG. 12, the roller remains in the location thereof in FIG. 11, and the backing 222 has been pulled back to expose the adhesive layer of the coating film to the ionizing nozzles 242, such that a flow of ionized air coats or flows over the film and adhesive layer 128 so as to electrically charge the surfaces and electrostatically repel any dust or other light particulates therefrom.

Next, as shown in FIG. 13, the roller 140 is moved by the installer to roll over the coating film and squeeze the adhesive 28 between the tack bar and glass on one side and the coating film 20 material on the other to firmly attach the film to the glass 10. The roller 140 is moved over the entire length of the glass to attach the coating film 20 thereto. As the roller 140 is moved over the coating layer, the backing layer 222 is pulled away from the adhesive layer 28, to continuously expose the adhesive layer and expose it to the ionizer bar and nozzles 242 providing ionized air to the adhesive layer 28 surface. Where the coating film is being dispensed from the feed roller, the backing 222 may be taken up by a take up roller, or manually peeled away by an additional installer. In this case, once the end of the glass is reached and the roller 140 has adhered the coating film 20 to at least the far edge of the glass, the coating film is then cut, and the roller 140 retracted and the free length of the coating film is withdrawn to the dispense roller. At any locations where the film has not been adhered to the underlying glass, a hard plastic scraper with a flat dull edge is used to press the film against the glass to adhere it thereto. Then, the edge of the coating film is cut to the edge of the glass, and the coating step is repeated, if desired, to secure additional coating films thereover. The film edge may be cut parallel and co planar with the substrate bevel after each film layer is adhered to the glass substrate, or all of the film layers together may be cut together to be parallel and co planar with the substrate bevel.

Where the coating film is cut nearly to size before the application thereof to the glass is begun, the installation follows the same steps, except the coating film sheet need not be cut to retract the free length to the dispense roller.

Where the substrate to be film coated is to receive multiple coating film layers, such as the glass of FIGS. 1 and 2 hereof, the coating process of FIGS. 8 to 13 hereof are repeated for each film layer.

During the handling of the substrate, for example a glass substrate 10, dust and other particulates can contact and adhere to the to be coated surface thereof. Likewise, as each film layer 20, 30 and 40 is sequentially adhered over the substrate and each other, dust and other particulates can contact and adhere to the upper surface thereof. Before each coating application, the surface to be coated is cleaned. However, dust and other particulates can contact and adhere to the to be coated surface thereafter. To address this issue, a mini-clean environment 300 is provided around the coating apparatus 100. Mini environment includes a cover 302, such as sheet of plastic, and a plurality of walls 304, in this case 4 walls laid out in a rectangular layout, each formed of a clear plastic wall 304, for example formed of individual sheets of plastic 304 extending from the cover 302 to the adjacent floor, or within an inch or so of the floor 308, wherein the edges thereof overlap. Such a plastic wall is commonly referred to as strip curtains or cooler curtains and is commonly used as temperature control curtains in front of refrigerated display cases allowing customer access to the goods in the display case behind the curtain. Other constructs of the wall, capable of limiting air flow therethrough while allowing individual persons access thereinto, as well as access for the coating film and substrates, may also be used. Alternatively, the coating device may be located in a clean environment wherein dust and particulates are removed by filtering.

The cover 302 and walls 304 form a controllable ambient environment. To condition the environment, an air filtering apparatus, such as filter system 310, is provided within the mini environment, or immediately adjacent thereto. Filter system includes a filtered intake 312, from which air within the mini-environment 310 is drawn in through a filter system, and an exhaust 314 from which filtered air is returned to the min-environment. The mini-environment 300, including the filter system 310, reduce particulates adjacent the bed of the coating apparatus, and thereby reduce the incidence of entraining dust and particulates between a film and the substrate, or between adjacent coating film layers.

What is claimed is:

1. A method of applying a film layer to a support, wherein the film layer is provided with an adhesive and a protective sheet covering the film layer and the film having a thickness, comprising:
    providing a bed comprising an substrate placement surface and a selectively positionable tack bar;
    providing a roller support moveable over a span of the bed and including a positioning bar;
    providing a roller rotatably supported to the positioning bar and moveable over the bed in response to movement of the roller support with respect to the bed;
    selecting a substrate having a thickness;
    positioning the tack bar on the surface of the substrate placement surface;
    positioning the substrate on the substrate placement surface in a position whereby a portion thereof is immediately adjacent to the tack bar;
    cleaning an exposed surface of the substrate;
    removing a portion of the protective sheet to expose a first portion of the adhesive on a first portion of the film;
    adhering the first portion of the film to the tack bar using the exposed adhesive;
    securing the portion of the protective sheet removed from the film to expose the first portion of the adhesive;
    pressing the roller against the first portion of the film on the tack bar; and
    moving the positioning bar, with the roller pressing against the first-portion of the film the tack bar, and cause the roller to roll over a second portion of the film overlying the substrate while removing a further portion of the protective sheet to exposes a second portion of the adhesive on the second portion of the film, the movement of the positioning bar the film, thereby causing the protective sheet to pull away from the second portion of the film and adhere the film to the substrate.

2. The method of claim 1, further comprising exposing the surface of at least one of the first and second portions of the film from which the protective sheet is removed to a source of ionized gas.

3. The method of claim 2, wherein the ionized gas is ionized air.

4. The method of claim 1, further comprising, after cleaning the surface of the substrate, spraying the surface with a filtered gas, and then applying the film to the surface of substrate.

5. The method of claim 1, further comprising:
    providing a plurality of openings extending through, and opening at, the substrate placement surface; and
        after applying the film to the surface of the substrate, providing a gas supply at a pressure greater than an ambient pressure around the apparatus to the plurality of openings.

6. The method of claim 1, further comprising:
    providing a plurality of openings extending through, and opening at, the substrate placement surface; and
        before applying the film to the surface of the substrate, providing a gas supply at a pressure greater than an ambient pressure around the apparatus to the plurality of openings and aligning the substrate with the tack bar.

7. The method of claim 1, further comprising, after applying the film to the substrate, trimming the side surfaces of the film.

8. The method of claim 7, wherein the side surface is trimmed to have a trimmed surface parallel to an adjacent substrate surface.

9. The method of claim 7, further comprising;
    providing a laser having sufficient power to ablate cut through a thickness of the film; and
    ablating away a surface of the film to form a trimmed edge thereon.

10. AR The method of claim 9, further comprising providing an automated guidance system for the laser.

11. The method of claim 1, further comprising providing a pinch;
    pinching the portion of the protective layer removed from the first portion of the film; and
    as the positioning bar moves to roll the roller over the film and substrate, maintain an end position of the protective film in the pinch stationary, or moving in a direction opposed to the movement direction of the positioning bar.

12. The method of claim 1, further comprising:
    providing a source of gas at a pressure greater than the ambient pressure; and
    after applying the film to the substrate, directing a stream of pressurized gas at an interface on the substrate and the support surface to thereby release the substrate from the support surface.

* * * * *